United States Patent
Jung et al.

(10) Patent No.: US 11,726,354 B2
(45) Date of Patent: Aug. 15, 2023

(54) DISPLAY DEVICE AND METHOD FOR MANUFACTURING THE SAME

(71) Applicant: Samsung Display Co., Ltd., Yongin-si (KR)

(72) Inventors: Jin Soo Jung, Hwaseong-si (KR); Young Gu Kim, Yongin-si (KR); Taek Joon Lee, Hwaseong-si (KR); Hye Lim Jang, Hwaseong-si (KR); Baek Kyun Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 106 days.

(21) Appl. No.: 17/317,821

(22) Filed: May 11, 2021

(65) Prior Publication Data
US 2021/0263345 A1 Aug. 26, 2021

Related U.S. Application Data

(62) Division of application No. 15/648,997, filed on Jul. 13, 2017, now Pat. No. 11,029,544.

(30) Foreign Application Priority Data

Oct. 14, 2016 (KR) .......................... 10-2016-0133773

(51) Int. Cl.
*G02F 1/00* (2006.01)
*G02F 1/13357* (2006.01)
(Continued)

(52) U.S. Cl.
CPC ...... *G02F 1/0063* (2013.01); *G02F 1/133502* (2013.01); *G02F 1/133514* (2013.01);
(Continued)

(58) Field of Classification Search
CPC ............ G02F 1/0063; G02F 1/133502; G02F 1/133514; G02F 1/133516;
(Continued)

(56) References Cited

U.S. PATENT DOCUMENTS 7,433,001 B2 10/2008 Han et al.
7,750,984 B2 7/2010 Ha et al.
(Continued)

FOREIGN PATENT DOCUMENTS

CN 1881034 12/2006
CN 103733243 4/2014
(Continued)

OTHER PUBLICATIONS

Partial European Search Report dated Feb. 21, 2018, issued in European Patent Application No. 17193005.0.
(Continued)

*Primary Examiner* — Jie Lei
(74) *Attorney, Agent, or Firm* — H.C. Park & Associates, PLC

(57) ABSTRACT

A display device including a first substrate, a pixel disposed on the first substrate and including first, second and third sub-pixel electrodes adjacent to each other, a second substrate spaced from the first substrate, a color conversion layer disposed on the second substrate and with a first wavelength conversion layer overlapping with the first sub pixel electrode and a second wavelength conversion layer overlapping with the second sub pixel electrode, a transmissive layer including a first sub-transmissive layer overlapping with the third sub-pixel electrode and a second sub-transmissive layer disposed between the first wavelength conversion layer and the second wavelength conversion layer, and a planarization layer disposed on the color conversion layer and the transmissive layer. A method of
(Continued)

manufacturing a display device having a flatter planarization layer with reduced variations in thickness is also disclosed.

9 Claims, 15 Drawing Sheets

(51) Int. Cl.
*G02F 1/1335* (2006.01)
*G02F 1/1337* (2006.01)
*G02F 1/1333* (2006.01)
*G02F 1/1362* (2006.01)
*G02F 1/163* (2006.01)

(52) U.S. Cl.
CPC .. *G02F 1/133516* (2013.01); *G02F 1/133617* (2013.01); *G02F 1/133707* (2013.01); *G02F 1/133357* (2021.01); *G02F 1/133548* (2021.01); *G02F 1/133565* (2021.01); *G02F 1/136281* (2021.01); *G02F 2001/1635* (2013.01); *G02F 2201/48* (2013.01); *G02F 2203/055* (2013.01)

(58) Field of Classification Search
CPC ......... G02F 1/133617; G02F 1/133707; G02F 1/133565; G02F 1/133548; G02F 1/133357; G02F 1/136281; G02F 2001/1635; G02F 2201/48; G02F 2203/055; G02B 1/111; G02B 1/113; G02B 1/14; G02B 6/0001; G02B 6/0011; G02B 5/0278; B82Y 10/00; B82Y 20/00; B82Y 30/00
USPC ....... 359/584, 580, 577, 242, 267, 275, 891; 349/61–66, 104, 106, 156; 977/774, 843, 977/951
See application file for complete search history.

(56) References Cited

U.S. PATENT DOCUMENTS

| | | |
|---|---|---|
| 9,995,958 B2 | 6/2018 | Park et al. |
| 9,995,963 B2 | 6/2018 | Park et al. |
| 10,429,690 B2 | 10/2019 | Park et al. |
| 10,983,386 B2 | 4/2021 | Park et al. |
| 11,409,155 B2 | 8/2022 | Park et al. |
| 2003/0147140 A1 | 8/2003 | Ito |
| 2013/0242228 A1 | 9/2013 | Park et al. |
| 2014/0168572 A1 | 6/2014 | Iwata et al. |
| 2014/0313691 A1 | 10/2014 | Kaida et al. |
| 2015/0205159 A1 | 7/2015 | Itou et al. |

FOREIGN PATENT DOCUMENTS

| | | |
|---|---|---|
| CN | 105929590 | 9/2016 |
| KR | 10-0658085 | 12/2006 |
| KR | 10-2013-0104862 | 9/2013 |

OTHER PUBLICATIONS

Extended European Search Report, dated on Jun. 27, 2018, in European patent application No. 17193005.0.
Requirement for Restriction/Election dated Feb. 8, 2019, in U.S. Appl. No. 15/648,997.
Non-Final Office Action dated Jul. 26, 2019, in U.S. Appl. No. 15/648,997.
Final Office Action dated Mar. 16, 2020, in U.S. Appl. No. 15/648,997.
Non-Final Office Action dated Jul. 7, 2020, in U.S. Appl. No. 15/648,997.
Notice of Allowance dated Feb. 22, 2021, in U.S. Appl. No. 15/648,997.
Korean Notice of Allowance dated Nov. 15, 2022, in Korean Patent Application No. 10-2016-0133773.

DISPLAY DEVICE AND METHOD FOR MANUFACTURING THE SAME

CROSS-REFERENCE TO RELATED APPLICATION

This application is a Division of U.S. patent application Ser. No. 15/648,997, filed on Jul. 13, 2017, which claims priority from and the benefit of Korean Patent Application No. 10-2016-0133773, filed on Oct. 14, 2016, which is hereby incorporated by reference for all purposes as if fully set forth herein.

BACKGROUND

Field

The invention relates generally to a display device and a method for manufacturing the same, and, more particularly, to a display device having reduced degree of imperfections in a planarization layer.

Discussion of the Background

Display devices are becoming more and more important as multimedia technology evolves. Accordingly, a variety of types of display devices such as liquid-crystal display (LCD) devices and organic light-emitting display (OLED) devices are currently used.

Among display devices, an LCD device is one of the most broadly used types of flat panel display devices. An LCD device often includes two substrates on which field generating electrodes such as a pixel electrode and a common electrode are formed, and a liquid-crystal layer interposed therebetween. An LCD device displays an image in such a manner that voltage is applied to field generating electrodes to generate electric field across a liquid-crystal layer, and liquid-crystal molecules in the liquid-crystal layer are aligned by the electric field so as to control the polarization of incident light.

Among such LCD devices, a vertically aligned (VA) mode LCD is a display device in which liquid-crystal molecules are oriented such that their major axes are perpendicular to the top and bottom of the display panel when no electric field is applied. VA mode LCDs are attracting attention since they have a large contrast ratio and achieve a wide viewing angle more easily.

LCD and other types of display device are made from multi-layer structures that include one or more planarization layers. The multi-layer structures are typically adhered together to form an integral display device.

The above information disclosed in this Background section is only for enhancement of understanding of the background of the inventive concepts, and, therefore, it may contain information that does not form the prior art that is already known in this country to a person of ordinary skill in the art.

SUMMARY

Applicants have recognized that steps or irregularities in the heights of a surface of a planarization layer in a display device can adversely affect the optical characteristics and performance of the display.

Display devices constructed according to the principles of the invention have a planarization layer with reduced variations in the height of the surface layer formed thereon to thereby improve the flatness of the planarization layer.

One of the benefits of having a flatter planarization layer is improved adherence between the various components and layers of the device. When the various components of the device are better adhered to one another, the quality of images displayed on the device is improved because undesirable separation of components and corresponding undesirable distances between components is reduced or prevented.

The invention also provides methods for manufacturing a display device having a flatter, planarization layer with reduced variations in thickness.

Additional aspects will be set forth in the detailed description which follows, and, in part, will be apparent from the disclosure, or may be learned by practice of the inventive concepts.

According to one aspect of the invention, a display device includes a first substrate, a pixel disposed on the first substrate and including first, second and third sub-pixel electrodes adjacent to each other, a second substrate spaced from the first substrate, a color conversion layer disposed on the second substrate, the color conversion layer including a first wavelength conversion layer overlapping with the first sub pixel electrode and a second wavelength conversion layer overlapping with the second sub pixel electrode, a transmissive layer including a first sub-transmissive layer overlapping with the third sub-pixel electrode and a second sub-transmissive layer disposed between the first wavelength conversion layer and the second wavelength conversion layer, and a planarization layer disposed on the color conversion layer and the transmissive layer.

The first wavelength conversion layer and the second wavelength conversion layer may include quantum dots or phosphor.

The first wavelength conversion layer may be configured to receive a light of a first wavelength range and to convert the light of the first wavelength range into a light of a second wavelength range different from the first wavelength range, and the second wavelength conversion layer may be configured to receive the light of the first wavelength range and to convert the light of the first wavelength range into a light of a third wavelength range different from the second wavelength range.

The transmissive layer may be configured to transmit the light of the first wavelength range.

The display device may further include a first filter configured to block the light of the first wavelength range and to transmit the light of the second wavelength range and the light of the third wavelength range, and the first filter may overlap with the color conversion layer.

The display device may further include a second filter configured to block the light of the first wavelength range and to reflect the light of the second wavelength range and the light of the third wavelength range, and the second filter may be disposed between the transmissive layer and the second substrate and disposed on the color conversion layer.

The transmissive layer may cover at least a part of the second filter.

The display device may further include a second filter configured to block the light of the first wavelength range and to reflect the light of the second wavelength range and the light of the third wavelength range, and the second filter may be disposed on the transmissive layer and the color conversion layer.

The planarization layer may include a first surface facing the first substrate and a second surface opposed to the first surface of the planarization layer, and variations in heights along the first surface of the planarization layer range from about 0 to about 40 nm.

The display device may further include a polarizing layer disposed on the planarization layer.

The polarizing layer may be a wire grid polarizer.

According to another aspect of the invention, a display device includes a substrate, a color conversion layer disposed on the substrate and including a first wavelength conversion layer configured to receive a light of a first wavelength range and to convert the light of the first wavelength range into a light of a second wavelength range, and a second wavelength conversion layer configured to receive the light of the first wavelength range and convert the light of the first wavelength range into a light of a third wavelength range, a filter disposed on the color conversion layer and configured to transmit the light of the first wavelength range and to reflect the light of the second wavelength range and the light of the third wavelength range, a transmissive layer disposed on the filter and configured to transmit the light of the first wavelength range, and a planarization layer disposed on the transmissive layer.

The transmissive layer may include a sub-transmissive layer disposed between the first wavelength conversion layer and the second wavelength conversion layer.

The first wavelength conversion layer and the second wavelength conversion layer may include quantum dots.

The light of the first wavelength range may be blue light, the light of the second wavelength range may be red light, and the light of the third wavelength range may be green light.

The planarization layer may include a first surface facing the substrate and a second surface opposed to the first surface of the planarization layer, and variations in heights along the second surface of the planarization layer may range from about 0 to about 40 nm.

The display device may further include a polarizing layer disposed on the planarization layer, wherein the polarizing layer includes a wire grid polarizer.

According to another aspect of the invention, a method for manufacturing a display device includes preparing a substrate having a first wavelength conversion layer configured to receive a light of a first wavelength range to configured to convert the light of the first wavelength range into a light of a second wavelength range, and a second wavelength conversion layer configured to receive the light of the first wavelength range and configured to convert the light of the first wavelength range into a light of a third wavelength range; forming a filter on the first and second wavelength conversion layers, the filter being configured to transmit the light of the first wavelength range and to reflect the light of the second wavelength range and the light of the third wavelength range, forming a transmissive layer on the filter, the transmissive layer being configured to transmit the light of the first wavelength range, and forming a planarization layer on the transmissive layer. The transmissive layer may comprise a sub-transmissive layer disposed between the first wavelength conversion layer and the second wavelength conversion layer.

The light of the first wavelength range may be blue light, the light of the second wavelength range may be red light, and the light of the third wavelength range may be green light.

The step of forming a planarization layer on the transmissive layer may include forming a first surface on a substrate and a second surface opposed to the first surface wherein variation in heights along the second surface may range from about 0 to about 40 nm.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
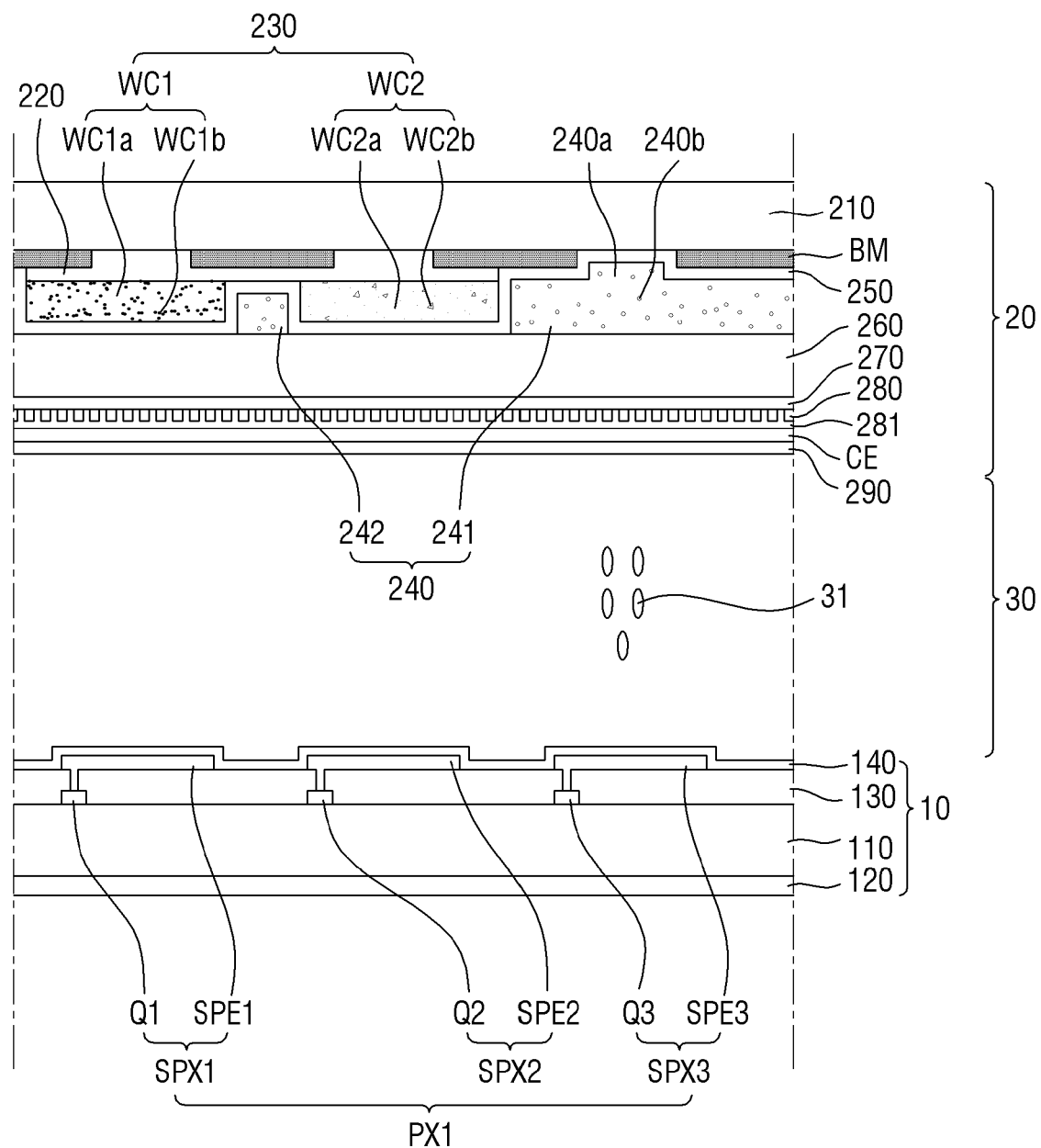
FIG. 1 is a fragmented cross-sectional view of a first embodiment of a display device constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Referring to FIG. 1, a display device may include a bottom display panel 10, a top display panel 20 and a liquid-crystal layer 30. Spatially relative terms such as "upper" and "lower" may be used herein as illustrated in FIG. 1. As used herein, the "upper side" of the lower substrate 110 refers to the side toward the upper substrate 210, and the "lower side" of the lower substrate 110 refers to the opposite side thereof. In addition, the "lower side" of the upper substrate 210 refers to the side toward the lower substrate 110, and the "upper side" of the upper substrate refers 210 to the opposite side thereof.

The bottom display panel 10 and the top display panel 20 may face each other. The liquid-crystal layer 30 may be interposed between the bottom display panel 10 and the top display panel 20 and may include a number of liquid-crystal molecules 31. The bottom display panel 10 and the top display panel 20 may be attached together by sealing.

The bottom display panel 10 will be described first. The lower substrate 110 may be a transparent insulation substrate. The transparent insulation substrate may include a glass substrate, a quartz substrate, a transparent resin substrate, etc.

A first polarizing layer 120 may be disposed under the lower substrate 110. More specifically, the lower substrate 110 may have a surface facing the upper substrate 210 and the other surface opposed to the surface. The first polarizing layer 120 may be disposed on the other surface of the lower substrate 110. The first polarizing layer 120 may be made of an organic material or an inorganic material. The first polarizing layer 120 may be a reflective polarizing layer. When the first polarizing layer 120 is a reflective polarizing layer, it may transmit polarization components in parallel with the transmission axis while reflecting polarization components in parallel with the reflection axis.

Alternatively, the first polarizing layer 120 may be disposed on the upper side of the lower substrate 110. That is, the first polarizing layer 120 may be disposed between the lower substrate 110 and a first insulation layer 130 to be described below.

A plurality of pixels including a first pixel PX1 may be disposed on the upper side of the lower substrate 110. The first pixel PX1 may include first to third sub-pixels SPX1 to SPX3. The first to third sub-pixels SPX1 to SPX3 may represent different colors.

The first sub-pixel SPX1 may include a first switching element Q1 and a first sub-pixel electrode SPE1 electrically connected to the first switching element Q1. The second sub-pixel SPX2 may include a second switching element Q2 and a second sub-pixel electrode SPE2 electrically connected to the second switching element Q2. The third sub-pixel SPX3 may include a third switching element Q3 and a third sub-pixel electrode SPE3 electrically connected to the third switching element Q3. The first to third sub-pixel electrodes SPE1 to SPE3 may be adjacent to one another.

The switching elements and the sub-pixel electrodes will be described in more detail with respect to the first sub-pixel SPX1.

Figure 2:
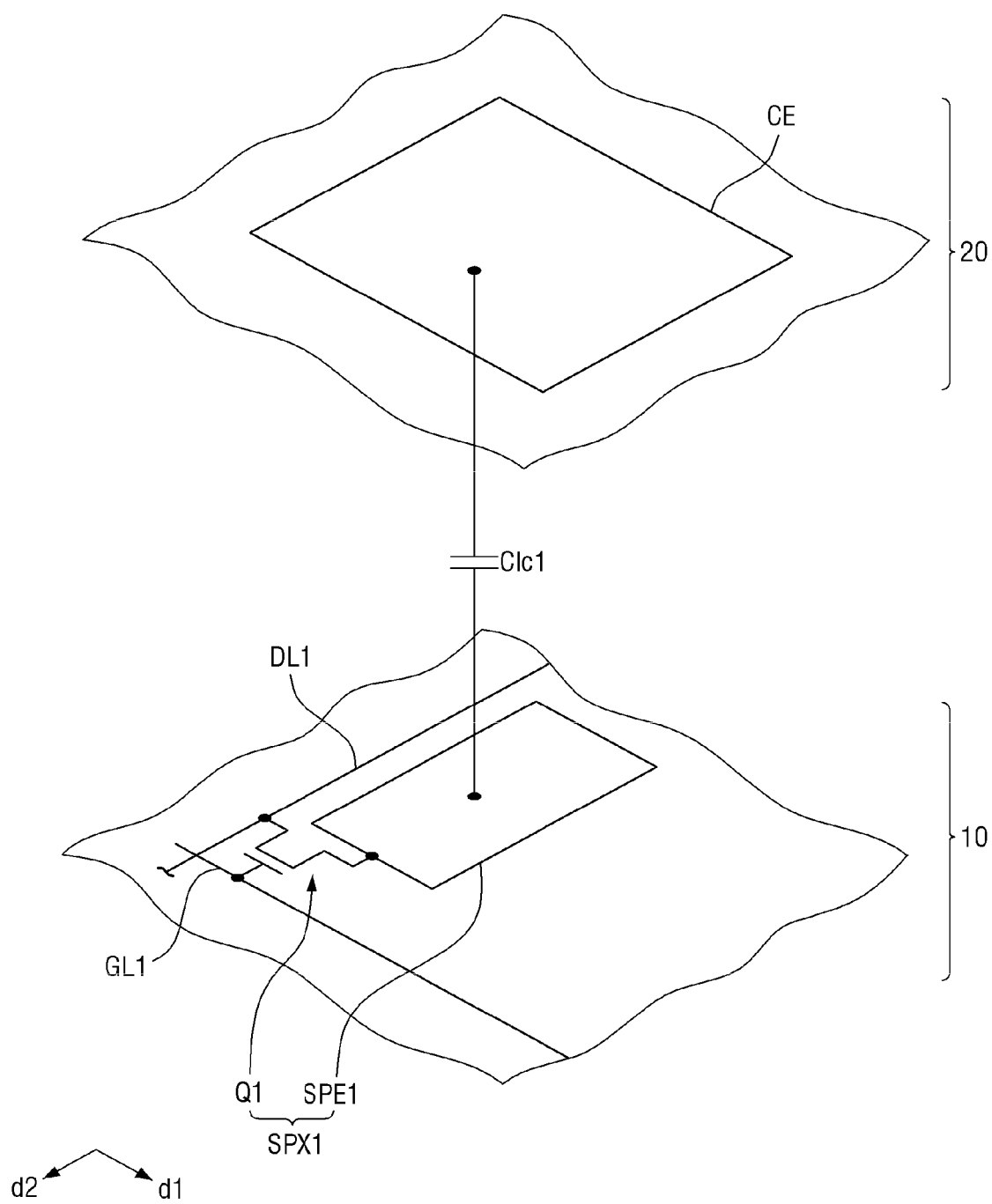
FIG. 2 is a schematic, perspective view of a first exemplary sub-pixel of the display device of FIG. 1.

Referring to FIG. 2, the first switching element Q1 may be an element having three terminals such as a thin-film transistor. A control electrode of the first switching element Q1 may be electrically connected to the first scan line GL1, and another electrode of the first switching element Q1 may be electrically connected to the first data line DL1. The other electrode of the first switching element Q1 may be electrically connected to the first sub-pixel electrode SPE1. The first scan line GL1 may extend in a first direction d1. The first data line DL1 may extend in a second direction d2 different from the first direction d1. The first direction d1 may intersect the second direction d2.

The first switching element Q1 may be turned on upon receiving a scan signal from the first scan line GL1 and may provide a data signal received from the first data line DL1 to the first sub-pixel electrode SPE1. Although the first sub-pixel SPX1 includes only the first switching element Q1 as depicted, the first sub-pixel SPX1 may include two or more switching elements.

The first sub-pixel SPE1 may be disposed on the bottom display panel 10. More specifically, the first sub-pixel electrode SPE1 may be disposed on the first insulation layer 130 (see FIG. 1) located on the lower substrate 110. The common electrode CE may be disposed on the top display panel 20. The first sub-pixel electrode SPE1 may overlap with the common electrode CE at least partially. Accordingly, the first sub-pixel SPX1 may further include a first liquid-crystal capacitor Clc1 formed between the overlapping first sub-pixel electrode SPE1 and the common electrode CE. As used herein, the phrase "two elements overlap one another" means that the two elements overlap one another in the vertical direction with respect to the lower substrate 110.

Referring again to FIG. 1, the first insulation layer 130 may be disposed over the first to third switching elements Q1 to Q3. The first insulation layer 130 may be made of an inorganic insulation material such as silicon nitride, silicon oxide, or similar materials. Alternatively, the first insulation layer 130 may include an organic material that is suitable for a flat surface and has photosensitivity. The first insulation layer 130 may include a plurality of contact holes for electrically connecting the first to third switching elements Q1 to Q3 with the first to third sub-pixels SPE1 to SPE3, respectively.

The first to third sub-pixel electrodes SPE1 to SPE3 may be disposed on the first insulation layer 130. The first to third sub-pixel electrodes SPE1 to SPE3 may be made of a transparent conductive material such as ITO and IZO or a reflective metal such as aluminum, silver, chrome or an alloy thereof. The first to third sub-pixel electrodes SPE1 to SPE3 may be overlapped by the common electrode CE.

A first wavelength conversion layer WC1 may overlap with the first sub-pixel electrode SPE1. A second wavelength conversion layer WC2 may overlap with the second sub-pixel electrode SPE2. One or more layers that transmit light, which are referred to herein as "transmissive layer(s)," may be provide in the display device. A first sub-transmissive layer 241 may overlap the third sub-pixel electrode SPE3. A more detailed description thereof is provided subsequently.

A lower alignment layer 140 may be disposed on the first to third sub-pixel electrodes SPE1 to SPE3. The lower alignment layer 140 may be made of polyimide or some other material known in the art.

Next, the top display panel 20 will be described.

The upper substrate 210 may be opposed to the lower substrate 110. The upper substrate 210 may be made of transparent glass, plastic, or a similar material known in the art, and may be made of the same material as the lower substrate 110.

A first black matrix BM may be disposed on the upper substrate 210 so as to block light emitted from the pixels. The first black matrix BM may be made of an organic material or a metallic material including chrome.

The first filter 220 may be disposed on at least a portion of the first black matrix BM and some portions of the upper substrate 210 where the first black matrix BM is not disposed. The first filter 220 may overlap the first wavelength conversion layer WC1, the second wavelength conversion layer WC2, and a second sub-transmissive layer 242.

The first filter 220 may block light having the first wavelength range and may transmit the light having the second wavelength range and the light having the third wavelength range. The first filter 220 will be described in more detail with respect to the first wavelength conversion layer WC1. The light having the first wavelength range supplied to the first wavelength conversion layer WC1 is converted into the light having the second wavelength range by the first wavelength conversion material WC1b. However, some of the light having the first wavelength range supplied to the first wavelength conversion layer WC1 may fail to be converted by the first wavelength conversion material WC1b. When this happens, the light of the first wavelength range may be mixed with the light of the second wavelength range that is successfully converted by the first wavelength conversion material WC1b, thereby causing color mixing of the colors of the converted and unconverted portions of the light. The first filter 220 then blocks the light that still has the first wavelength range even after having passed through the first wavelength conversion layer WC1, thereby preventing color mixing and improving color purity of the light that passes beyond the first filter 220.

The first to third wavelength ranges may be different from one another. The first wavelength range may have a central wavelength from approximately 420 nm to 480 nm. Accordingly, the light having the first wavelength range may be blue light. The second wavelength range may have a central wavelength from approximately 600 nm to 670 nm. Accordingly, the light having the second wavelength range may be red light. The third wavelength range may have a central wavelength from approximately 500 nm to 570 nm. Accordingly, the light having the third wavelength range may be green light.

In the following description, the light having the first wavelength range will be described as blue light, the light having the second wavelength range will be described as red light, and the light having the third wavelength range will be described as green light. Accordingly, the first filter 220 may block blue light and transmit red light and green light. That is, the first filter 220 may be a blue cut-off filter. The first filter 220 may be formed of either a single film or multiple films.

The color conversion layer 230 may include the first wavelength conversion layer WC1 and the second wavelength layer WC2.

The first wavelength conversion layer WC1 may overlap with the first sub-pixel electrode SPE1. The first wavelength conversion layer WC1 may contain a first light-transmitting resin WC1a and a first wavelength-converting material WC1b.

The first wavelength-converting material WC1b may be dispersed in the first light-transmitting resin WC1a to convert or shift the light supplied to the first wavelength conversion layer WC1 into the light having the second wavelength range. The light supplied to the first wavelength conversion layer WC1 may be the light having the first wavelength range, that is, blue light. Accordingly, the first wavelength conversion layer WC1 may receive blue light from the outside and convert it into red light.

The first wavelength-converting material WC1b may include first quantum dots, as is known in the art. The particle size of the first quantum dots is not particularly limited as long as the first wavelength-converting material WC1b can convert the light received from the outside into the light of the second wavelength range. The first wavelength-converting material WC1b can be dispersed and naturally coordinated in the first light-transmitting resin WC1a. The first light transmitting resin WC1a is not particularly limited as long as it is a transparent medium that does not affect the wavelength conversion performance of the first wavelength converting material WC1b and does not cause light absorption.

For example, the first light-transmitting resin WC1a may include epoxy, polystyrene, and acrylate. The first wavelength conversion layer WC1 may include an organic solvent instead of the first light-transmitting resin WC1a. The organic solvent may include toluene, chloroform, and ethanol.

The second wavelength conversion layer WC2 may overlap with the second sub-pixel electrode SPE2. The second wavelength conversion layer WC2 may contain a second light-transmitting resin WC2a and a second wavelength-converting material WC2b.

The second wavelength-converting material WC2b may be dispersed in the second light-transmitting resin WC2a to convert or shift the light supplied to the second wavelength conversion layer WC2 into the light having the third wavelength range. The light supplied to the second wavelength conversion layer WC2 may be blue light, and accordingly, the second wavelength conversion layer WC2 may receive blue light from the outside and convert it into green light.

The second wavelength-converting material WC2b may include second quantum dots. The particle size of the second quantum dots is not particularly limited as long as the second wavelength-converting material WC2b can convert the light received from the outside into the light of the third wavelength range. The average particle size of the second wavelength-converting material WC2b may be smaller than the average particle size of the first wavelength-converting material WC1b.

The second wavelength-converting material WC2b can be dispersed and naturally coordinated in the second light-transmitting resin WC2a. The second light transmitting resin WC2a is not particularly limited as long as it is a transparent medium that does not affect the wavelength conversion performance of the second wavelength converting material WC2b and does not cause light absorption.

For example, the second light-transmitting resin WC2a may include epoxy, polystyrene, and acrylate. The second wavelength conversion layer WC2 may include an organic solvent instead of the second light-transmitting resin WC2a. The organic solvent may include toluene, chloroform, and ethanol.

The first quantum dots and the second quantum dots may be selected from group II-VI compounds, group III-V compounds, group IV-VI compounds, group IV elements, group IV compounds, and a combination thereof.

The group II-VI compounds may be selected from the group consisting of: binary compounds selected from the group consisting of CdSe, CdTe, ZnS, ZnSe, ZnTe, ZnO, HgS, HgSe, HgTe, MgSe, MgS and a mixture thereof; ternary compounds selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and a mixture thereof; and quaternary compounds selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe and a mixture thereof.

The group III-V compounds may be selected from the group consisting of: binary compounds selected from the group consisting of GaN, GaP, GaAs, GaSb, AlN, AlP, AlAs, AlSb, InN, InP, InAs, InSb and a mixture thereof; ternary compounds selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP and a mixture thereof; and quaternary compounds selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb and a mixture thereof.

The group IV-VI compounds may be selected from the group consisting of: binary compounds selected from the group consisting of SnS, SnSe, SnTe, PbS, PbSe, PbTe and a mixture thereof; ternary compounds selected from the group consisting of SnSeS, SnSeTe, SnSTe, PbSeS, PbSeTe, PbSTe, SnPbS, SnPbSe, SnPbTe and a mixture thereof; and quaternary compounds selected from the group consisting of SnPbSSe, SnPbSeTe, SnPbSTe and a mixture thereof. The group IV elements may be selected from the group consisting of Si, Ge and a mixture thereof. The group IV compounds may be selected from the group consisting of SiC, SiGe and a mixture thereof.

The binary compounds, the ternary compounds or the quaternary compounds may be present in the particles at a uniform concentration, or may be present in the same particles at partially different concentrations. In addition, they may have a core/shell structure in which one quantum dot surrounds another quantum dot. The interface between the core and the shell may have a concentration gradient that the concentration of the element present in the shell decreases closer to the center.

The first quantum dots and the second quantum dots may have a full width of half maximum (FWHM) of the emission wavelength spectrum of approximately 45 nm or less, preferably approximately 40 nm or less, more preferably approximately 30 nm or less. Within this range, color purity and color gamut can be improved. Also, light emitted through the first quantum dot and the second quantum dot is emitted in all directions, so that the viewing angle can be improved.

In addition, the first quantum dots and the second quantum dots may have a spherical shape, a pyramidal shape and a multi-arm shape, or may be cubic nanoparticles, nanotubes, nanowires, nanofibers, nano-platelets or the like.

Alternatively, each of the first wavelength-converting material WL1b and the second wavelength-converting material WC2b may contain quantum rods or phosphor materials, as well as quantum dots. The phosphor may have a size of approximately 100 to 3,000 nm. Further, the phosphor may include yellow, green, and red fluorescent materials.

That is, the first and second wavelength-converting materials WC1b and WC2b absorb the light supplied to the first wavelength conversion layer WC1 and the second wavelength conversion layer WC2, respectively, to emit light having a central wavelength different that of the absorbed light. More specifically, the first and second wavelength-converting materials WC1*b* and WC2*b* may scatter the light incident on the first wavelength conversion layer WC1 and the second wavelength conversion layer WC2, respectively, to emit light in different directions irrespective of the incident angles. That is, display devices constructed according to the principles of the invention described herein can improve the viewing angle by emitting light in various directions through the first and second wavelength-converting materials WC1*b* and WC2*b*.

The polarization of the light emitted from the first wavelength conversion layer WC1 and the second wavelength conversion layer WC2 may be cancelled, i.e., exit the conversions layers in unpolarized state. Herein, unpolarized light refers to light that does not consist only of polarization components in a particular direction, i.e., that consists of random polarization components not polarized only in a particular direction. For example, the unpolarized light may be natural light.

The second filter 250 may be disposed on the first wavelength conversion layer WC1 and the second wavelength layer WC2. The second filter 250 may overlap with the first black matrix BM and at least a part of the upper substrate 210. The thickness of the second filter 250 may be approximately 1 μm.

The second filter 250 may transmit light having the first wavelength range and may reflect the light having the second wavelength range and the light having the third wavelength range. That is, the second filter 250 may transmit blue light and reflect red light and green light. In this manner, the second filter 250 can improve the emission efficiency of the light emitted from the first wavelength conversion layer WC1 and the second wavelength layer WC2. The second filter 250 may surround the first wavelength conversion layer WC1 and the second wavelength layer WC2.

For example, the portion of the second filter 250 that surrounds the first wavelength conversion layer WC1 may transmit blue light to supply it to the first wavelength conversion layer WC1. The blue light supplied to the first wavelength conversion layer WC1 is converted into red light by the first wavelength conversion material WC1*b* and is emitted toward the upper substrate 210, that is, to the outside. On the other hand, among the converted red light, light directed toward the lower substrate 110, not toward the upper substrate 210, may be reflected by some portion of the second filter 250 surrounding the first wavelength conversion layer WC1.

The second filter 250 may be formed of either a single film or multiple films. When the second filter 250 is formed of multiple films, the second filter 250 may comprise a layer containing $SiN_x$ and a layer containing $SiO_x$. The layer containing $SiN_x$ and the layer containing $SiO_x$ may be alternately stacked.

In addition, the display device may include the first filter 220 and the second filter 250 to thereby prevent color mixing. The display device can improve the emission efficiency of the light emitted from the first and second wavelength conversion layers WC1 and WC2 to thereby improve color gamut.

As noted above, a transmissive layer 240 may be disposed on the second filter 250. The transmissive layer 240 may include the first sub-transmissive layer 241 and the second sub-transmissive layer 242. The first sub-transmissive layer 241 may overlap the third sub-pixel electrode SPE3. The second sub-transmissive layer 242 may be disposed between the first wavelength conversion layer WC1 and the second wavelength conversion layer WC2. In other words, referring to FIG. 1, the second sub-transmissive layer 242 may be disposed adjacent to the first wavelength conversion layer WC1 and the second wavelength conversion layer WC2 in a direction parallel to the direction in which the lower substrate 110 extends.

The transmissive layer 240 may include a third light-transmitting resin 240*a* and a light-scattering material 240*b*.

The light-scattering material 240*b* may be dispersed in the third light-transmitting resin 240*a* to scatter light supplied to the transmissive layer 240 and emit the light to the outside. More specifically, the transmissive layer 240 may scatter light of the first wavelength range supplied to the transmissive layer 240, that is, blue light, to the outside. The light-scattering material 240*b* may scatter light supplied to the transmissive layer 240 in various directions irrespectively of the incident angle. The emitted light may be unpolarized, i.e., in an unpolarized state.

The light-scattering material 240*b* may have a refractive index different from that of the third light-transmitting resin 240*a*. For example, the light-scattering material 240*b* may be, but is not limited to, one of $TiO_2$, $ZrO_2$, $Al_2O_3$, $In_2O_3$, ZnO, $SnO_2$, $Sb_2O_3$, and ITO. Any material may be used for the light-scattering material 240B as long as it can scatter incident light. The second sub-transmissive layer 242 may be disposed between the first wavelength conversion layer WC1 and the second wavelength conversion layer WC2. Accordingly, the second sub-transmissive layer 242 can fill the gap between the first wavelength conversion layer WC1 and the second wavelength conversion layer WC2 to reduce variations in thickness, that is, to reduce the differences in height along the top surface of the planarization layer 260, as described subsequently. For example, filling the gap between the first wavelength conversion layer WC1 and the second wavelength conversion layer WC2 with the second sub-transmissive layer 242 eliminates much space into which the planarization layer 260 may sag during a process of forming the planarization layer. By preventing the planarization layer from sagging in that manner, the differences in height along the top surface of the planarization layer 260 are reduced. Accordingly, the distances from the top surface of the upper substrate 210 to planarization layer 260 can be formed substantially equal across the width of the device, such that the flatness of the planarization layer 260 can be improved, which will be described later. A detailed description thereof will be made below with reference to FIGS. 3 and 4.

The planarization layer 260 may be disposed on the transmissive layer 240 and the second filter 250. The planarization layer 260 may be made of an organic material. When the first wavelength conversion layer WC1, the second wavelength conversion layer WC2 and the transmissive layer 240 have different thicknesses, the planarization layer 260 may regulate the heights of the elements stacked on a surface of the upper substrate 210. Detailed description of the planarization layer 260 will be made below.

The second insulation layer 270 may be disposed on the planarization layer 260. The second insulation layer 270 may be made of an inorganic insulation material such as silicon nitride, silicon oxide, or other similar materials. The second insulation layer 270 may be eliminated.

A second polarizing layer 280 may be disposed on the second insulation layer 270. The second polarizing layer 280 may include a conductive material that allows electric current to flow. The conductive material may include a metal including aluminum (Al), silver (Ag), gold (Au), copper (Cu) and nickel (Ni). In addition, the conductive material may further include titanium (Ti) and molybdenum (Mo).

The second polarizing layer 280 may be a wire grid polarizer. Accordingly, the second polarizing layer 280 may include a plurality of line grating patterns projecting toward the lower substrate 110. The second polarizing layer 280 may include aluminum, silver, copper, nickel, or other similar materials.

For example, after the incident light passes through the second polarizing layer 280, components in parallel with the second polarizing layer 280 may be absorbed or reflected, and only vertical components are transmitted such that polarized light can be produced. It is to be noted that the larger the gap between the line grid patterns of the second polarizing layer 280, the more efficiently the polarization can be achieved. The second polarizing layer 280 may be formed by nanoimprinting or the like.

A capping layer 281 may be disposed on the second polarizing layer 280. The capping layer 281 can suppress defects such as corrosion of the second polarizing layer 280 and can provide a flat upper surface over the second polarizing layer 280.

The common electrode CE may be disposed on the capping layer 281. The common electrode CE may overlap at least a part of each of the first to third sub-pixel electrodes SPE1 to SPE3. The common electrode CE may be a single, continuous electrode. The common electrode CE may be made of a transparent conductive material such as ITO and IZO or a reflective metal such as aluminum, silver, chrome or an alloy thereof.

An upper alignment layer 290 may be disposed on the common electrode CE. The upper alignment layer 290 may be made of polyimide or some other material.

Hereinafter, the liquid-crystal layer 30 will be described.

The liquid-crystal layer 30 may include a number of liquid-crystal molecules 31. The liquid-crystal molecules 31 may have a negative dielectric anisotropy. When no electric filed is applied across the liquid-crystal layer 30, the liquid-crystal molecules 31 may be orientated in a direction perpendicular to the lower substrate 110. When an electric field is formed between the lower substrate 110 and the upper substrate 210, the liquid-crystal molecules 31 may be rotated or tilted in a particular direction to thereby change the polarization of light supplied to the liquid-crystal layer 30.

Figure 3:
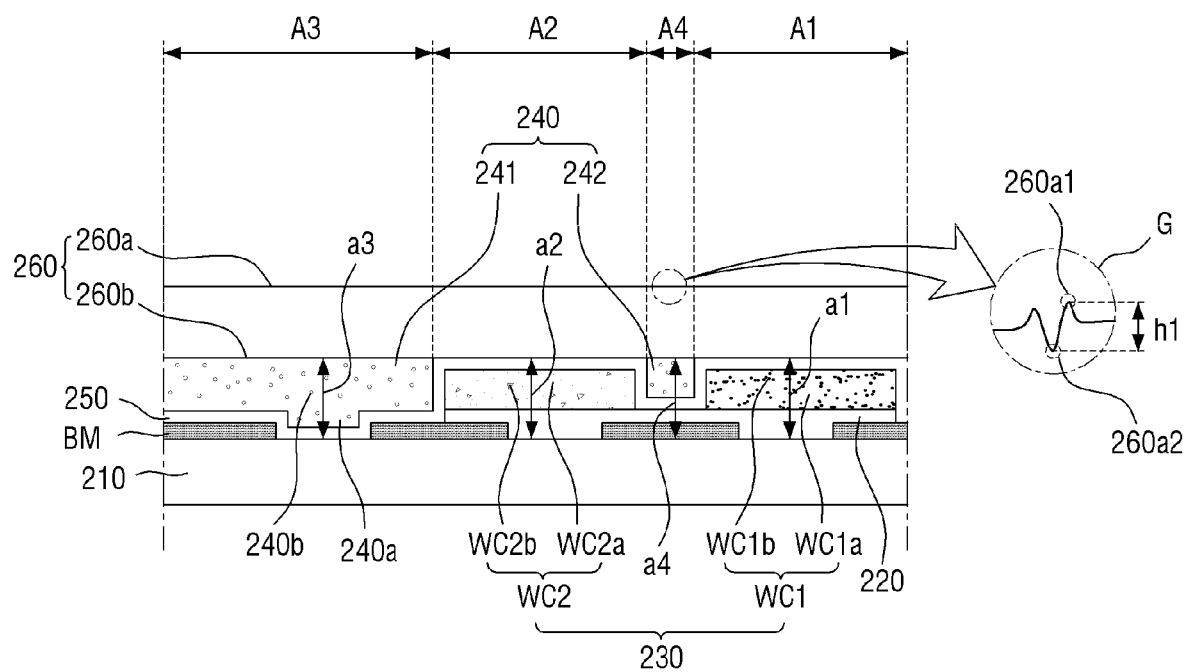
FIG. 3 is a fragmented cross-sectional view showing additional detail of some of the elements of the display device of FIG. 1 in a reversed orientation.

Referring now to FIG. 3, the planarization layer 260 may include a surface 260a and the other surface 260b. The other surface 260b of the planarization layer 260 may be defined as the surface facing the upper substrate 210. The first sub-transmissive layer 241 and the second sub-transmissive layer 242 may be disposed under the other surface 260b of the planarization layer 260.

Some elements of the top display panel 20 shown in FIG. 3 may be divided into first to fourth sub-areas A1 to A4. The first area A1 is defined as an area where the first wavelength conversion layer WC1 is disposed. The second area A2 is defined as an area where the second wavelength conversion layer WC2 is disposed. The third area A3 is defined as an area where the first sub-transmissive layer 241 is disposed. The fourth area A4 is defined as an area where the second sub-transmissive layer 242 is disposed. The fourth area A4 may be disposed between the first and second areas A1 and A2.

In the fourth area A4, the second sub-transmissive layer 242 is disposed. Accordingly, the space between the first wavelength conversion layer WC1 and the second wavelength conversion layer WC2 is filled with the second sub-transmissive layer 242, such that the step difference, that is, the difference between the minimum and the maximum heights formed on the other surface 260b of the planarization layer 260, can be reduced. Thus, as used herein, the step difference on a surface refers to the difference in height (thickness) between the lowest portion 260a2 and the highest portion 260a1 of the surface 260a, as shown best in inset portion G of FIG. 3. As the step difference on the other surface 260b of the planarization layer 260 is reduced, the step difference on the surface 260a of the planarization layer 260 can also be reduced.

In other words, in the first to fourth areas A1 to A4, the shortest distances a1 to a4 from the upper substrate 210 to the other surface 260b of the planarization layer 260 may be all substantially equal. As the step difference on the other surface 260b of the planarization layer 260 is reduced, the step difference on the surface 260a of the planarization layer 260 may range from about 0 to about 40 nm. That is, as long as the step difference on the surface 260a of the planarization layer 260 ranges about 0 to about 40 nm, the shortest distances a1 to a4 may be considered as all being substantially equal. An example will be given for a more detailed description.

FIG. 3 shows an enlarged view of area G, a portion of the surface 260a of the planarization layer 260. Referring to area G, the display device described herein can reduce the difference in height h1 between the highest portion 260a1 and the lowest portion 260a2 of the surface 260a of the planarization layer 260, that is, the step difference on the surface 260a of the planarization layer 260. The step difference on the surface 260a of the planarization layer 260 ranges about 0 to about 40 nm. It is to be noted that the thickness of the first sub-transmissive layer 241, the thickness of the second sub-transmissive layer 242, the thickness of the first wavelength conversion layer WC1, the thickness of the second wavelength conversion layer WC2, and the thickness of the second filter 250 are not limited to those shown in FIG. 3, as long as the step difference on the surface 260a of the planarization layer 260 ranges from about 0 to about 40 nm.

Figure 4:
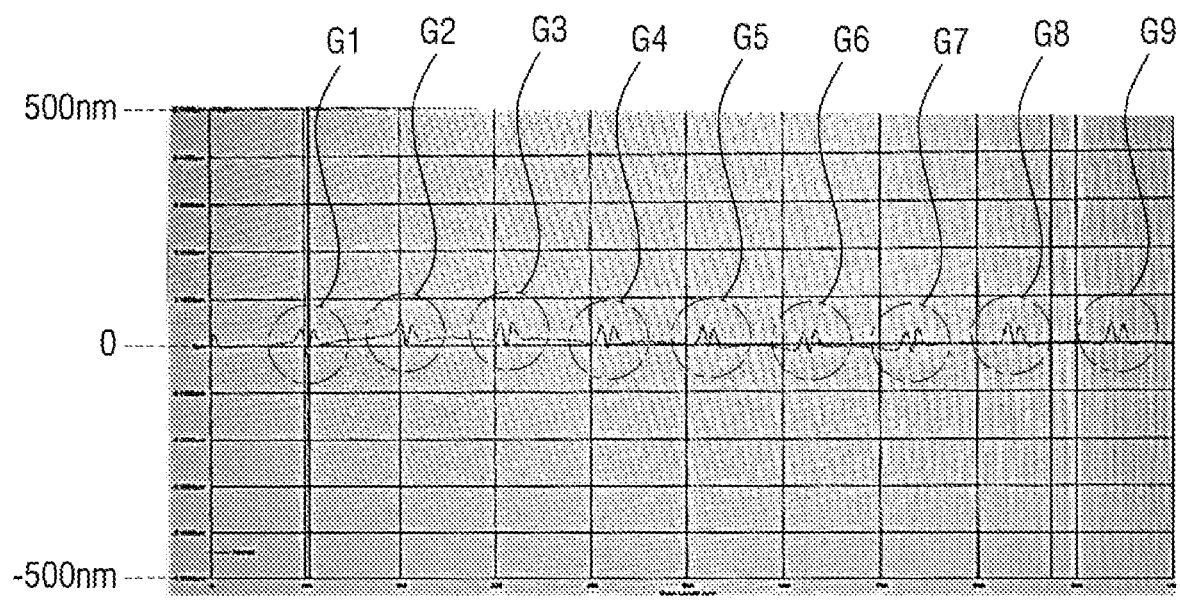
FIG. 4 is a graphical representation of the flatness of a planarization layer of the display device of FIG. 1.

Referring to FIG. 4, the step differences on one surface 260a of the planarization layer 260 may differ depending on the positions of the surface 260a of the planarization layer 260 taking into account processing conditions, the positional relationship with other elements, and other factors known in the art. However, in each of the areas G1 to G9, the step difference ranges from about 0 to about 40 nm.

Accordingly, the flatness of the planarization layer 260 in devices constructed according to the principles of the invention can be improved by reducing the step difference on the surface 260a of the planarization layer 260.

Figure 5:
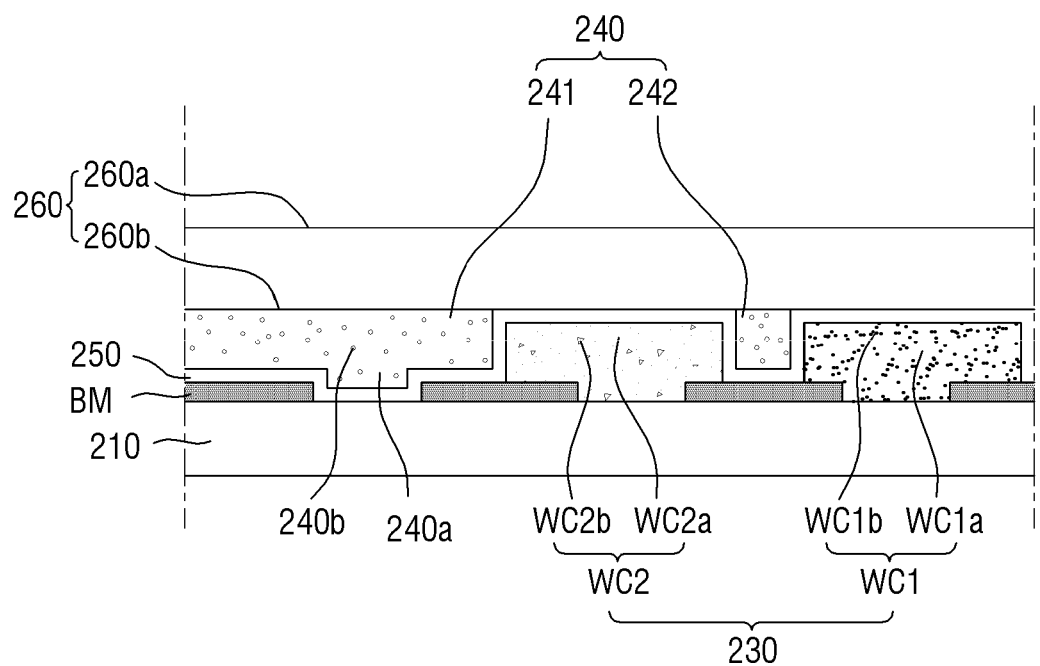
FIG. 5 is a fragmented cross-sectional view of a second embodiment of some of the elements of a display device constructed according to the principles of the invention.

Referring to FIG. 5, the elements already described above with respect to FIG. 1 to 4 will not be described again to avoid redundancy. The first wavelength conversion layer WC1 and the second wavelength conversion layer WC2 may be disposed on the first black matrix BM and the upper substrate 210 where the first black matrix BM is not disposed. That is, the first filter 220 shown in FIG. 1 may be eliminated.

Figure 6:
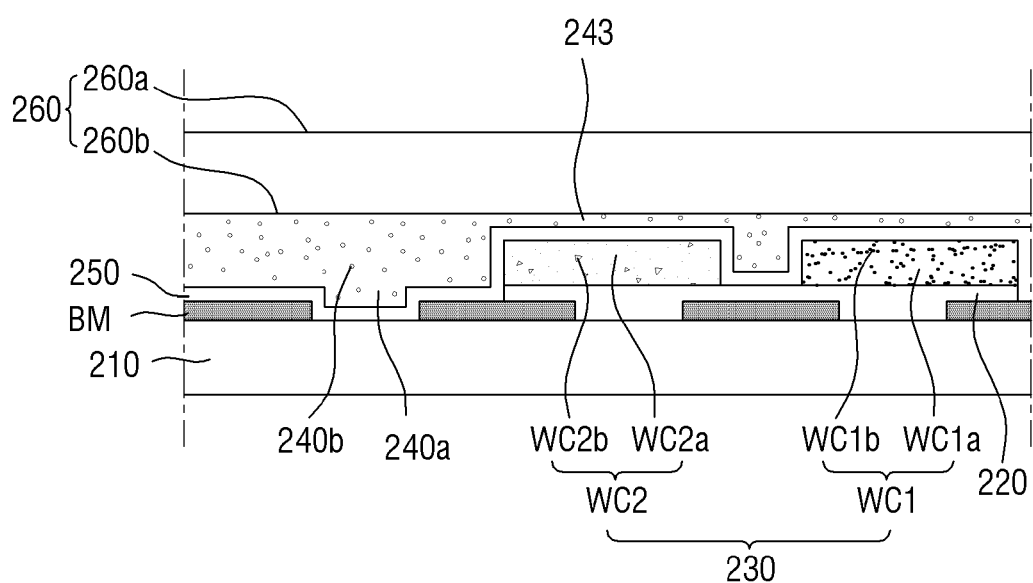
FIG. 6 is a fragmented cross-sectional view of a third embodiment of some of the elements of a display device constructed according to the principles of the invention.

Referring to FIG. 6, the elements already described above with respect to FIGS. 1 to 4 will not be described again to avoid redundancy. A transmissive layer 243 may be disposed on the second filter 250 such that it may cover at least a part of the second filter 250. The transmissive layer 243 may be disposed on the second filter 250 such that it covers the second filter 250.

Figure 7:
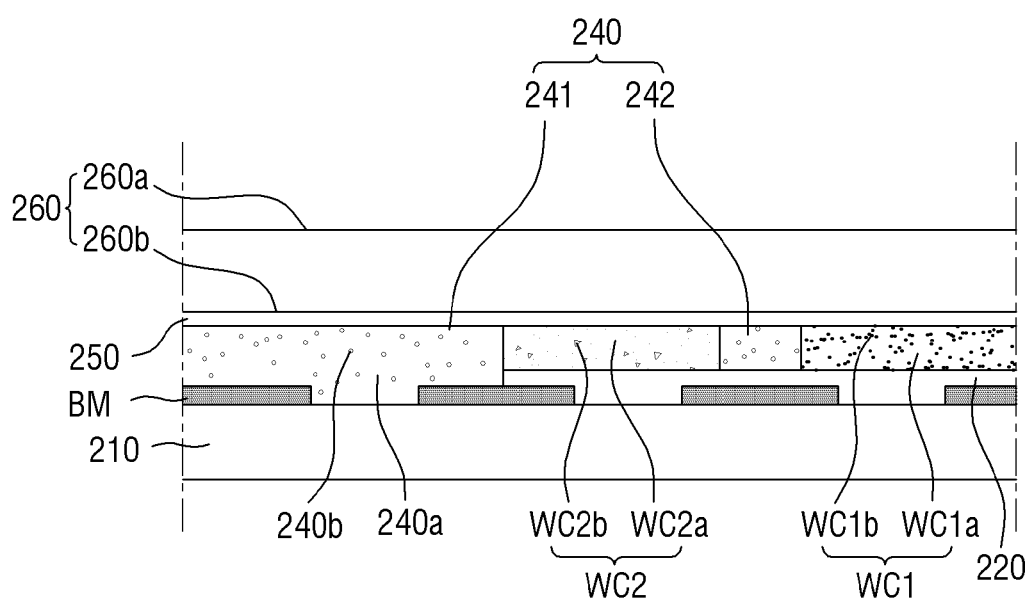
FIG. 7 is a fragmented cross-sectional view of a fourth embodiment of some of the elements of a display device constructed according to the principles of the invention.

Referring to FIG. 7, the elements already described above with respect to FIGS. 1 to 4 will not be described again to avoid redundancy. A second filter 250 may be disposed on a transmissive layer 240 such that it covers at least a part of the transmissive layer 240. The second filter 250 may be disposed such that it covers a first sub-transmissive layer 241, a second sub-transmissive layer 242, a first wavelength conversion layer WC1, and a second wavelength conversion layer WC2.

Figure 8:
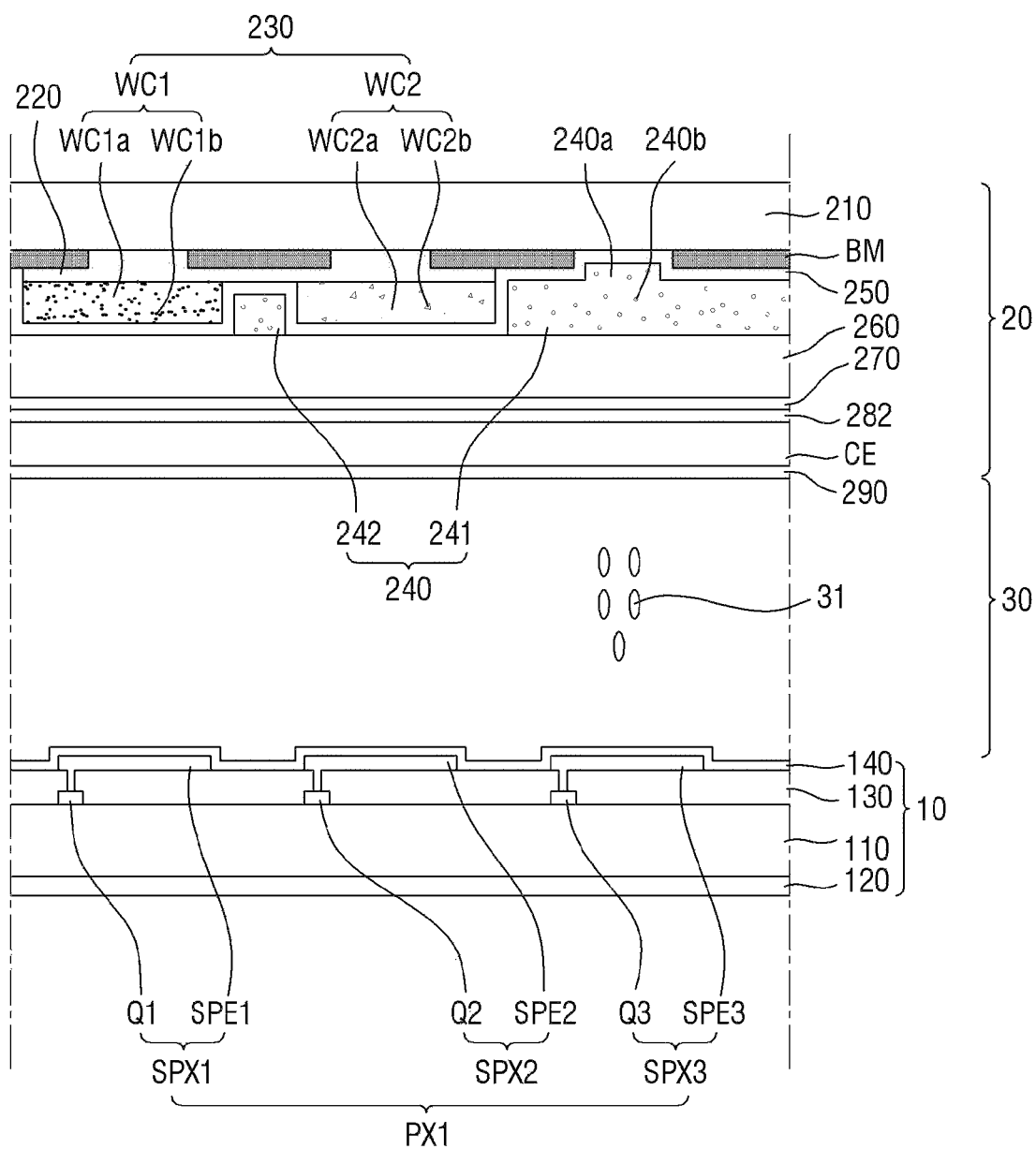
FIG. 8 is a fragmented cross-sectional view of a fifth embodiment of a display device constructed according to the principles of the invention.

Referring to FIG. 8, the elements already described above with respect to FIGS. 1 to 7 will not be described again to avoid redundancy. Referring to FIG. 8, a second polarizing layer 282 may be disposed on a second insulation layer 270. The second polarizing layer 282 may be a reflective polarizer. When the second polarizing layer 282 is a reflective polarizing layer, it may transmit polarization components in parallel with the transmission axis while reflecting polarization components in parallel with the reflection axis.

The second polarizing layer 282 may contain a dichroic dye. The dichroic dye is not particularly limited as long as it is a material capable of absorbing a polarization component in a particular direction.

As such, the second polarizing layer 282 is disposed inside the top display panel 20, and accordingly it is possible to prevent the light supplied from the outside from being refracted by the first polarizing layer 120 to cause color change or image distortion. As a result, display characteristics can be improved. Moreover, in an exemplary embodiment, the thickness of the second polarizing layer 282 may be approximately 1 μm or less. As a result, the overall thickness of the top display panel 20 can be reduced.

Figure 9:
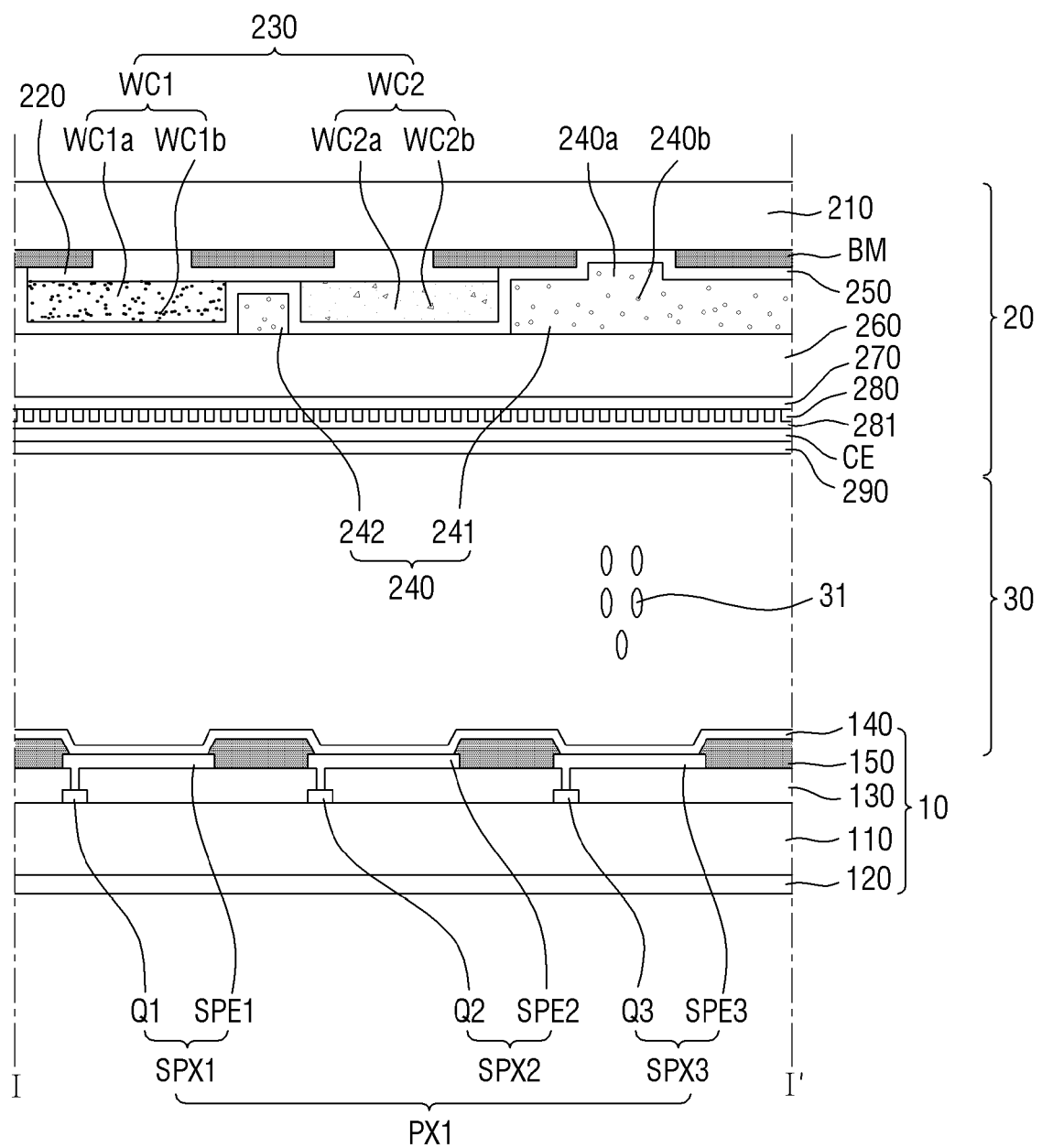
FIG. 9 is a fragmented cross-sectional view of a sixth embodiment of a display device constructed according to the principles of the invention.

Referring to FIG. 9, the elements already described above with respect to FIGS. 1 to 8 will not be described again to avoid redundancy. A bottom display panel 10 may further include a plurality of second black matrices 150. Each of the second black matrices 150 may be disposed between a first insulation layer 130 and a lower alignment layer 140.

The second black matrices 150 may be at least partially overlapped with the first black matrix BM and the lower substrate 110 in the vertical direction. Thus, it is possible to prevent different colors from being introduced into the first wavelength conversion layer WC1 and the second wavelength conversion layer WC2 by the light-scattering material 240b included in the first sub-transmissive layer 241 and the second sub-transmissive layer 242.

It is to be noted that the shape, size, thickness, number and the like of the second black matrices 150 are not limited to those shown in FIG. 9 as long as it is possible to prevent different colors from being introduced into the first wavelength conversion layer WC1 and the second wavelength conversion layer WC2 by the light-scattering material 240b included in the first sub-transmissive layer 241 and the second sub-transmissive layer 242.

Referring to FIGS. 10 to 15, description of the exemplary manufacturing method shown therein will also be made with reference to the top display panel 20 shown in FIG. 1.

Figure 10:
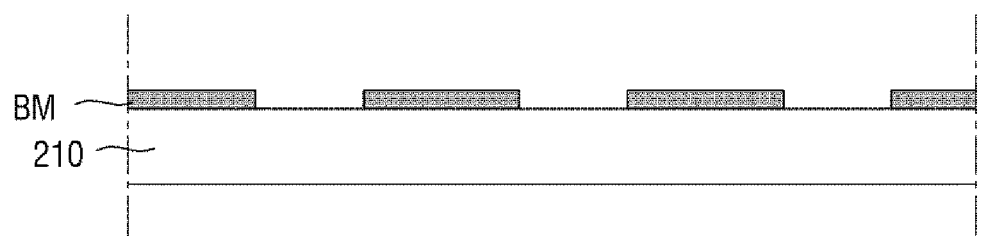
FIGS. 10 to 15 are fragmented cross-sectional views of sequential steps an exemplary method for manufacturing a top display panel of the display device of FIG. 1 according to the principles of the invention.

Referring to FIGS. 1 and 10, a first black matrix BM is formed on an upper substrate 210. The first black matrix BM may be formed of a material that blocks light. The first black matrix BM may be made of an organic material or a metallic material including chrome. The first black matrix BM may include a plurality of openings. The plurality of openings may overlap with first to third sub-pixel electrodes SPE1 to SPE3 in the direction vertical to the lower substrate 110.

Figure 11:
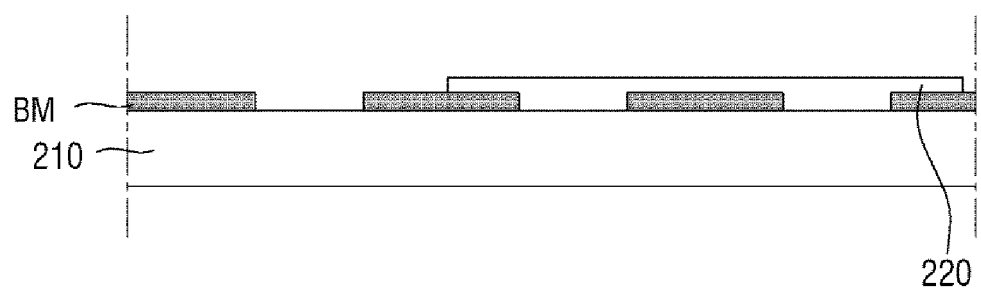

Referring to FIG. 11, a first filter 220 is formed on the first black matrix BM and some portions of the upper substrate 210 where the first black matrix BM is not formed. More specifically, the first filter 220 may be formed such that it overlaps the first sub-pixel electrode SPE1 and the second sub-pixel electrode SPE2 in the direction orthogonal to the direction in which the lower substrate 110 extends.

The first filter 220 may block light having the first wavelength range, i.e., blue light. In addition, the first filter 220 may transmit light having the second wavelength range, i.e., red light and light having the third wavelength range, i.e., green light.

The first filter 220 may be formed by stacking at least two layers having different refractive indexes. One of the two layers, which has a higher refractive index, may include TiOx, TaOx, HfOx, ZrOx, and similar materials. In addition, one of the two layers, which has a lower refractive index, may include SiOx, SiCOx, and other similar materials.

The first filter 220 may be formed as a single layer. When the first filter 220 is formed as a single layer, the first filter 220 may be a yellow color filter. A yellow photoresist is formed such that it covers the first black matrix BM and the entire area where the first black matrix BM is not formed, and a patterning process is carried out such that the photoresist remains only in the regions overlapping with the first sub-pixel electrode SPE1 and the second sub-pixel SPE2 in the direction orthogonal to the direction in which the lower substrate 110 extends, thereby forming the first filter 220.

Figure 12:
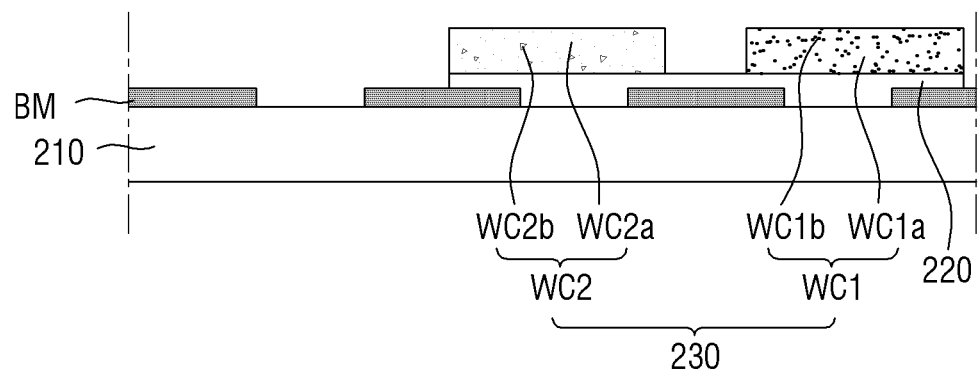

Next, referring to FIG. 12, a first wavelength conversion layer WC1 and a second wavelength conversion layer WC2 are formed on the first filter 220. The order in which the first wavelength conversion layer WC1 and the second wavelength conversion layer WC2 are formed is not particularly limited.

More specifically, a material containing a plurality of first quantum dots for converting blue light into red light is stacked on a transparent organic material or a transparent photoresist, and then a patterning process is carried out such that the organic material or the photoresist remains only in the regions overlapping with the first sub-pixel electrode SPE1 in the direction orthogonal to the direction in which the lower substrate 110 extends.

In addition, a material containing a plurality of second quantum dots for converting blue light into green light is stacked on a transparent organic material or a transparent photoresist, and then a patterning process is carried out such that the organic material or the photoresist remains only in the regions overlapping with the second sub-pixel electrode SP2 in the direction orthogonal to the direction in which the lower substrate 110 extends.

Figure 13:
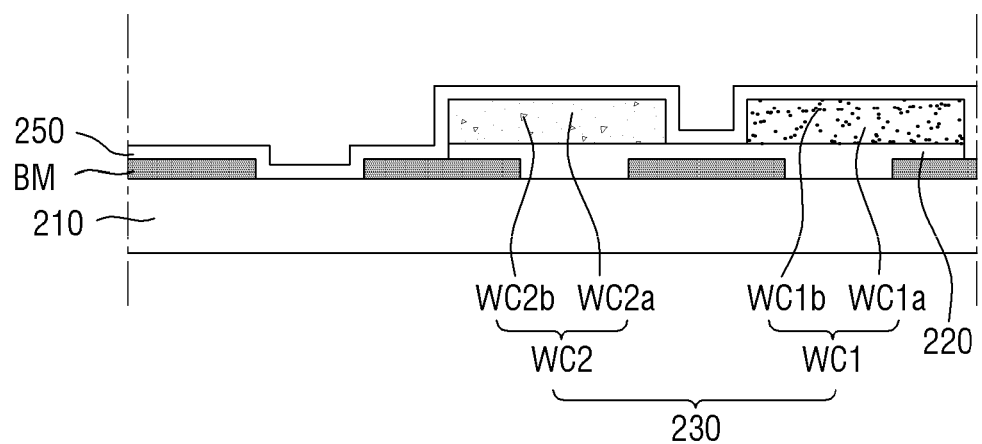

Subsequently, referring to FIG. 13, a second filter 250 is formed on the first wavelength conversion layer WC1 and the second wavelength conversion layer WC2. The thickness of the second filter 250 may be approximately 1 μm. The second filter 250 may transmit light having the first wavelength range and may reflect the light having the second wavelength range and the light having the third wavelength range. That is, the second filter 250 may transmit blue light and reflect red light and green light.

The second filter 250 may be formed by stacking at least two layers having different refractive indexes. More specifically, the second filter 250 may be formed by repeating a process of alternately stacking a layer containing SiNx and a layer containing $SiO_x$. One of the two layers, which has higher refractive index, may include TiOx, TaOx, HfOx, ZrOx, and the like. In addition, one of the two layers, which has a lower refractive index, may include $SiO_x$, SiCOx, and the like.

Figure 14:
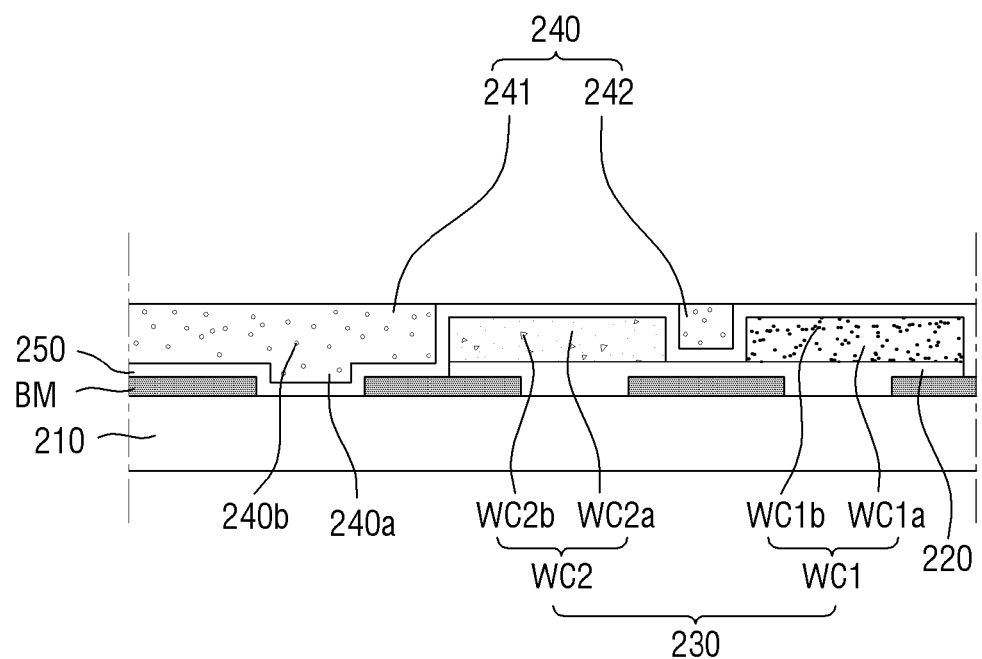

Referring to FIG. 14, a transmissive layer 240 is formed on the second filter 250. The transmissive layer 240 may include a first sub-transmissive layer 241 overlapping with the first sub-pixel electrode SPE1 in the direction orthogonal to the direction in which the lower substrate 110 extends, and a second sub-transmissive layer 242 disposed between the first wavelength conversion layer WC1 and the second wavelength conversion layer WC2. As a result, the distances from the upper substrate 210 to the planarization layer 260 can be made substantially equal, such that the step difference on the other surface 260b of the planarization layer 260 can be reduced.

The transmissive layer 240 may be formed by stacking a material containing light-scattering material 240b for diffusing incident light on a transparent organic material or a transparent photoresist, and then a patterning process is carried out such that the organic material or the photoresist remains only in the regions overlapping with the third sub-pixel electrode SPE3 in the direction vertical to the lower substrate 110 and the regions between the first wavelength conversion layer WC1 and the second wavelength conversion WC2. The light-scattering material 240b is not particularly limited as long as it is a material capable of diffusing light. The light-scattering material 240b may include titanium oxide (TiO$_2$).

Figure 15:
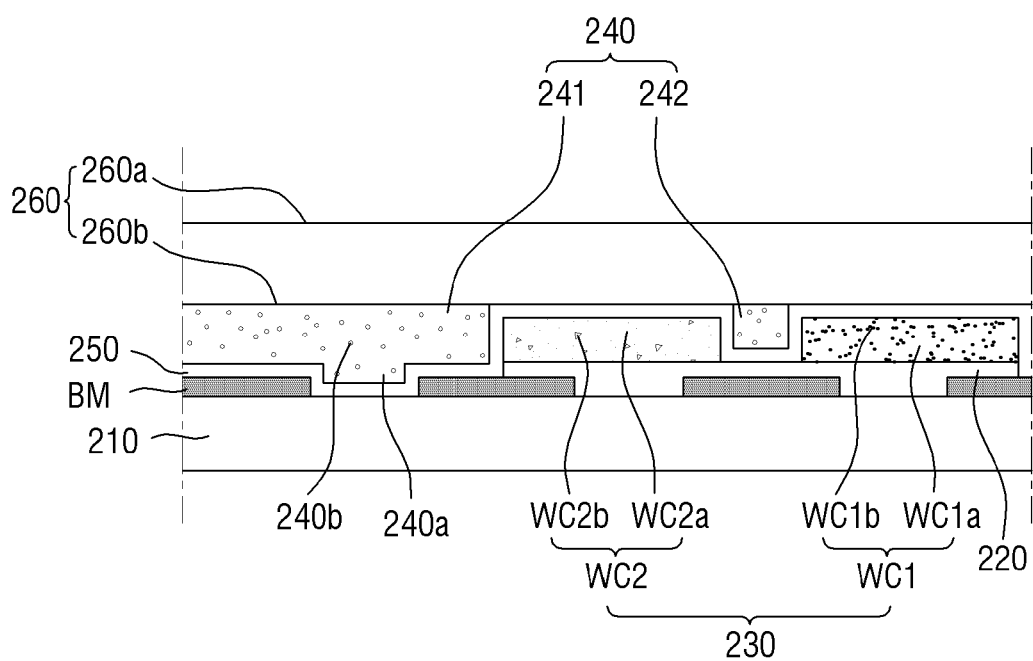

Subsequently, referring to FIG. 15, a planarization layer 260 is formed on the transmissive layer 240 and the second filter 250. More specifically, the planarization layer 260 may have a surface 260a and an opposing surface 260b. The first sub-transmissive layer 241 and the second sub-transmissive layer 242 may be disposed under the other surface 260b of the planarization layer 260. The planarization layer 260 may be made of an organic material.

The space between the first wavelength conversion layer WC1 and the second wavelength conversion layer WC2 is filled with the second sub-transmissive layer 242, such that the step difference on the other surface 260b of the planarization layer 260 can be reduced. Accordingly, the step difference on the other surface 260b of the planarization layer 260 is reduced, and thus the step difference on the surface 260a of the planarization layer 260 can also be reduced.

The step difference on the surface 260a of the planarization layer 260 may range about 0 to about 40 nm. That is, by the method for manufacturing a display device described herein, the flatness of the planarization layer 260 can be improved by reducing the step difference on the surface 260a of the planarization layer 260.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display device comprising:
   a substrate;
   a color conversion layer disposed on the substrate and comprising a first wavelength conversion layer configured to receive a light of a first wavelength range and to convert the light of the first wavelength range into a light of a second wavelength range, and a second wavelength conversion layer configured to receive the light of the first wavelength range and to convert the light of the first wavelength range into a light of a third wavelength range;
   a filter disposed on the color conversion layer and configured to transmit the light of the first wavelength range and to reflect the light of the second wavelength range and the light of the third wavelength range;
   a transmissive layer disposed on the filter and configured to transmit the light of the first wavelength range; and
   a planarization layer disposed on the transmissive layer, wherein:
   the transmissive layer is disposed between the filter and the planarization layer;
   a portion of the filter is disposed between the transmissive layer and the substrate; and
   the first wavelength conversion layer and the second wavelength conversion layer are disposed between the filter and the substrate.

2. The display device according to claim 1, wherein the transmissive layer comprises a sub-transmissive layer disposed between the first wavelength conversion layer and the second wavelength conversion layer.

3. The display device according to claim 1, wherein the first wavelength conversion layer and the second wavelength conversion layer comprise quantum dots.

4. The display device according to claim 1, wherein the light of the first wavelength range is blue light, the light of the second wavelength range is red light, and the light of the third wavelength range is green light.

5. The display device according to claim 1, wherein the planarization layer comprises a first surface facing the substrate and a second surface opposed to the first surface of the planarization layer, and
   wherein variations in heights along the second surface of the planarization layer range from about 0 to about 40 nm.

6. The display device of claim 1, further comprising a polarizing layer disposed on the planarization layer, wherein the polarizing layer includes a wire grid polarizer.

7. A method for manufacturing a display device, comprising the steps of:
   preparing a substrate having a first wavelength conversion layer configured to receive a light of a first wavelength range and configured to convert the light of the first wavelength range into a light of a second wavelength range, and a second wavelength conversion layer configured to receive the light of the first wavelength range and configured to convert the light of the first wavelength range into a light of a third wavelength range;
   forming a filter on the first and second wavelength conversion layers, the filter being configured to transmit the light of the first wavelength range and to reflect the light of the second wavelength range and the light of the third wavelength range;
   forming a transmissive layer on the filter, the transmissive layer being configured to transmit the light of the first wavelength range; and
   forming a planarization layer on the transmissive layer, wherein:
   the transmissive layer comprises a sub-transmissive layer disposed between the first wavelength conversion layer and the second wavelength conversion layer;
   the transmissive layer is disposed between the filter and the planarization layer;
   a portion of the filter is disposed between the transmissive layer and the substrate; and
   the first wavelength conversion layer and the second wavelength conversion layer are disposed between the filter and the substrate.

8. The method according to claim 7, wherein the light of the first wavelength range is blue light, the light of the second wavelength range is red light, and the light of the third wavelength range is green light.

9. The method according to claim 7, wherein the step of forming a planarization layer on the transmissive layer comprises forming a first surface on a substrate and a second surface opposed to the first surface wherein variation in heights along the second surface ranges from about 0 to about 40 nm.

\* \* \* \* \*